3,440,293
HYDRATION OF OLEFINS TO ALCOHOLS
Robert J. Rosscup, Valparaiso, Ind., Alex Zletz, Chicago Heights, and Luke A. Schaap, South Holland, Ill., assignors to Standard Oil Company, Chicago, Ill., a corporation of Indiana
No Drawing. Continuation-in-part of application Ser. No. 170,231, Jan. 31, 1962. This application Mar. 17, 1966, Ser. No. 535,033
Int. Cl. C07c *29/04, 43/02;* B01j *11/40*
U.S. Cl. 260—641                   11 Claims This invention relates to the direct hydration of olefins and more particularly pertains to the catalytic hydration of $C_2$ to $C_5$ olefin hydrocarbons to the corresponding $C_2$ to $C_5$ alcohols in using a silica-alumina catalyst of low alumina content.

This application is a continuation-in-part of our application Ser. No. 170,231, filed Jan. 31, 1962 and now abandoned.

The hydration of olefins in the presence of a variety of metal oxide catalysts has been proposed for both vapor phase and liquid phase or flooded operation. As useful metal oxide catalysts there have been proposed blue tungsten oxide alone or mixtures of oxides from alumina, zirconia, silica and thoria. The catalysts composed of silica and alumina ranged from 90 to 70% silica and 10 to 30% alumina to 90 to 70% alumina and 10 to 30% alumina. Such silica-alumina catalyst mixtures ranged from alumina deposited on the surface of preformed silica, silica deposited on the surface of preformed alumina and uniform mixtures of silica and alumina. These prior processes, in general, use high mole ratios of water to olefin in the range of 18 to 100 moles water per mole of olefin in contact with the oxide catalyst. Such prior processes also use rather low weight hourly space velocities of olefin to catalyst generally in the range of 0.4 to 1.0 part of olefin per part of catalyst. The contacting of water-olefin mixtures with oxide catalyst in those prior processes is carried out at temperatures in the range of 200 to 650° F. and pressures in the range of 375 to 6000 pounds per square inch (p.s.i.).

The foregoing prior processes possess many disadvantages which make them unattractive for commercial operation. The high mole ratios of water to olefin require the heating and pressuring of relatively large quantities of water. The high mole ratios of water to olefin not only require the handling of large volumes of water, but also result in limiting the volume of water-olefin mixtures which can be contacted per unit volume of catalyst. Because of the latter the catalysts contact zone must be large relative to the throughput of olefin. However, the low alcohol yields reported as being obtained from those prior processes ranged from about 1.0% to about 28% per pass through the contacting zone based on the olefin charged. The use of such high mole ratios of water to olefin and the resultant low yields of alcohol obviously produce as a reaction product a rather dilute aqueous alcohol. Also important disadvantages of those prior alcohol. Also important disadvantages of those prior processes are the co-production of olefin polymers in amounts equal to or exceeding the desired alcohol and the co-production of ethers at the combinations of temperatures and pressures at the higher limits of the foregoing ranges of temperature and pressure.

As hereinbefore indicated, this invention is concerned with the direct hydration of $C_2$ to $C_5$ olefins to the corresponding $C_2$ to $C_5$ alcohols by contacting water-olefin mixtures with silica-alumina catalysts of low alumina content. The prior teachings most pertinent thereto is found in U.S. Patent No. 2,658,924. This patent is mainly concerned with direct hydration of olefins by contacting high water mole ratios of water-olefin mixtures at low olefin to catalyst weight hourly space velocities with a catalyst consisting of particles of substantially porous alumina on whose surface silica is uniformly deposited to provide a predominantly silica surface amounting to 10 to 30% silica and 90 to 70% alumina on a weight basis. It is readily apparent that such a catalyst is not of uniform silica and alumina composition throughout individual catalyst particles. But said patent does contain teachings pertinent to catalyst particles substantially uniform in silica and alumina content in the range of 10 to 25% alumina and 90 to 75% silica. For such mixtures of 10 to 25% alumina and 90 to 75% silica to possess catalytic activity for the direct hydration of olefins to 1 to 11% alcohol yields under liquid phase conditions, Patent No. 2,658,924 teaches that it is mandatory to pretreat such uniform mixtures of silica-alumina with liquid water alone under the aforementioned olefin hydration conditions of temperature and pressure before contacting the catalyst with olefin-water mixtures. The catalyst contacting zone is left flooded with water under said conditions of temperature and pressure and the high mole ratio of water to olefin is then introduced into the water flooded catalytic contacting zone producing therein a still higher mole ratio of water to olefin in said contacting zone.

We have discovered a process for direct catalytic hydration of $C_2$ to $C_5$ olefin hydrocarobns to $C_2$ to $C_5$ alcohols which employs water-olefin mole ratios having 10 or less moles of water per mole of olefin to the catalytic contacting zone, high weight hourly space velocities of water-olefin mixture per weight of catalyst and a catalyst whose particles are of substantially uniform silica and alumina content. Our process is applicable over a wide range of temperature and pressure combinations without converting substantial amounts of olefin to ether or olefin polymer. Our process produces high single pass yields of alcohol in the range of 37 to 129 weight percent based on the olefin which because of the lower water to olefin mole ratio results in a higher alcohol content of the aqueous alcohol product. It is readily apparent that our process not only overcomes the disadvantages of the related prior processes but also has advantages clearly not possessed by those prior processes.

We have discovered that $C_2$ to $C_5$ olefin hydrocarbons can be directly hydrated to the corresponding $C_2$ to $C_5$ alcohols using a silica-alumina catalyst whose particles consist essentially of 10 to 30% alumina and 90 to 70% silica in a substantially uniform composition throughout and said catalyst is contacted with water-olefin mixtures having 1 to 10 moles water per mole of olefin without first pretreating said catalyst with water under olefin hydration conditions. Our process is conducted under wholly liquid phase conditions at water-olefin contacting with catalyst at temperatures in the range of 300 to 675° F., pressures in the range of 2000 to 100,000 pounds per square inch and weight hourly space velocities in the range of 2 to 20 parts of water-olefin mixture per part of catalyst by weight. Eliminating the hereinbefore mentioned disadvantages of prior art processes using metal oxide catalysts, especially silica-alumina catalysts, and obtaining the hereinbefore mentioned advantages for the process of this invention occur in spite of eliminating the prior art teaching of the mandatory pretreatment of 10 to 30% alumina and 90 to 70% silica catalyst with water under olefin hydrating conditions before contacting the catalyst with water-olefin mixtures.

The flow-rate "weight hourly space velocity" in the disclosure and claims is used to designate the weight ratio of flow of water-olefin mixture or olefin, as indicated, per hour per unit weight of catalyst contacted. This is one accepted rate unit for fluid flow in catalytic contacting processes. Another rate unit for fluid flow in catalytic contacting processes is volume hourly space velocity which designates the volume of indicated material contacted per hour per unit volume of catalyst. One fluid velocity can be converted to the other provided the weight per unit volume of catalyst is known. For the purposes of defining the process of this invention there will be used weight hourly space velocity.

We have discovered that $C_2$ to $C_5$ olefins can be hydrated to the corresponding alcohol in the presence of silica-alumina catalyst containing 10 to 30% alumina and 90 to 70% silica by weight at elevated temperatures and pressures higher than those heretofore suggested as being advantageously operable by employing a wholly liquid phase system, utilizing a low mole ratio of water to olefin, and, in contrast to the processes heretofore proposed or suggested, employing higher weight hourly space velocities. By "weight hourly space velocities" as employed herein is meant the weight of liquid phase water-olefin mixture contacted with a unit weight of catalyst.

In general, the process of this invention comprises contacting a water-$C_2$ to $C_5$ olefin hydrocarbon mixture in a catalytic contacting zone at a temperature in the range of from 300 to 675° F. and at a pressure in said contacting zone to maintain wholly liquid phase conditions, pressures of from 2000 to 100,000 pounds per square inch (p.s.i.) being suitable, with the silica-alumina catalyst whose particles are of a substantially uniform alumina and silica composition in the range of 10 to 30% alumina and 90 to 70% silica, preferably the particles have a high surface area per unit of weight. Suitable silica-alumina catalysts are those having surface areas of at least 200 square meters per gram. It is also preferred that the silica-alumina catalyst contain substantially no alkali metal for such substantially alkali metal free silica-alumina (10 to 30% $Al_2O_3$-90 to 70% $SiO_2$) catalysts have a longer on-stream catalyst life. Suitable weight hourly space velocities for the process of this invention are in the range of 2 to 20 parts water-olefin mixture per part of catalyst. The size of the catalyst particles is not critical. Desirably the catalyst particles can be in the range of from 4 to 200 mesh, that is 100% should pass through a 4-mesh screen but none should pass through a 200-mesh screen. Preferably, the catalyst particles for fixed bed operation should not be smaller than 100 mesh, and should be in the range of 20 to 80 mesh.

The process of this invention, although applicable to the conversion of ethylene to ethanol, propylene to isopropanol, butene-1 to 2-butanol, isobutylene to t-butyl alcohol, pentene-1 to amyl alcohol, and the like olefins to the corresponding $C_2$ to $C_5$ alcohols, it is especially advantageous for converting propylene to isopropanol in a single pass through the contacting zone in high yields, 50 to 130 weight percent based on propylene charged (about 26 to 91 mole percent) with little or no formation of diisopropyl ether or polymer or coke formation. Effluents from the contacting zone contain up to as much as 59 volume percent isopropanol. When the process of this invention is applied to the conversion of propylene to isopropanol at pressures in the range of 2,000 to 100,000 p.s.i.g., desirable temperatures for contacting water-propylene mixtures with catalyst are in the range of 350 to 575° F. Preferably, the contacting temperature are in the range of 400 to 525° F. As will be hereinafter demonstrated, the preferred temperature range for any particular pressure in the range of 2,000 to 100,000 p.s.i. will vary somewhat but will be in the 400 to 525° F. range. As the contacting pressure increases, the preferred temperature range decreases. That is, the preferred temperature range for operation at 2,000 to 5,000 p.s.i. is higher than the preferred temperature range for operation at 90,000 to 100,00 p.s.i.

As hereinbefore stated, prior processes for hydration of olefins to their corresponding alcohols proposed the use of silica, alumina, thoria, etc., as catalysts and even various combinations thereof. However, these processes using such catalysts at 250 to 600° F. and pressures up to 1,000 6,000 p.s.i., have reported rather low weight yields of iso- to 2,000 p.s.i. with suggested pressures as high as 3,000 to propanol, generally under 20%, based on the weight of propylene charged. These prior disclosures suggest and teach the use of 3,000 to 6,000 pressures lead to the coking of catalyst or olefin polymer formation or ether formation and/or other processing difficulties. Such processes suggested employing volume hourly space velocities in the range 0.5 to 5.0 volumes total feed per volume of catalyst.

In U.S. Patent No. 2,658,924 there is exemplified the use of a catalyst consisting of 10% alumina and 90% silica at 590° F. and 1500 p.s.i. for the direct hydration of propylene to isopropanol. The catalyst was used in bead form in a 500 ml. volume. This 500 ml. of bead catalyst was treated in a contacting zone with water at 590° F. and 1500 p.s.i. Thereafter a feed consisting of 924 grams propylene and 3,991 grams water at 1,500 p.s.i. was introduced at a volume hourly space velocity of 3.0 into the contacting zone containing the water pretreated 500 ml. of a 10% alumina-90% silica catalyst at 590° F. The isopropanol yield was reported as 12 weight percent. The weight hourly space velocity of propylene was about 0.4 to 0.5 (specific gravity of catalyst 0.9 to 1.1 gm. per. ml.).

We have found that by our process the hereinbefore mentioned high weight percent yields of isopropanol from propylene using the 10 to 25% alumina-90% to 75% silica uniform composition content silica-alumina catalyst are obtained when using propylene weight hourly space velocities above 1.0, desirably in the range of 1.0 to 6.0 and preferably in the range of 1.5 to 3.0. Total water-propylene mixture weight hourly space velocities in the range of 2 to 20 will provide the high propylene weight hourly space velocities. To compare the much higher space velocities of the process of this invention with the space velocities suggested previously, the same 924 grams of propylene and 3,991 grams of water are employed in the process of our invention at a propylene weight hourly space velocity of 1.5 with 500 ml. of non-water pretreated catalyst of specific gravity of 0.92 (460 grams). This water-propylene mixture is passed through and in contact with the catalyst in about 80 minutes instead of 4 hours (320 minutes). The throughput by the process of this invention would be four times as great per hour. At such a higher propylene weight hourly space velocity employed, for example at 5,000 p.s.i. and 525° F. contacting pressure and temperature with a mole ratio of water to propylene of 5 instead of 10, a 50 weight percent yield of isopropanol instead of the prior 12 weight percent may be obtained. Or at contacting conditions of 2,000 p.s.i., 500° F., a propylene weight hourly space velocity of about 1.0 (about 2 hours for 924 grams of propylene feed), a 43 weight percent yield of isopropanol may be obtained by the process of this invention. The process of this invention employing much higher weight hourly space velocities of olefin, especially propylene, not only produces a greater weight prcent yield of alcohol, but can also achieve a much higher throughput per unit weight of catalyst.

The process of this invention is illustrated by the following specific examples wherein propylene is converted to isopropanol. In each of these examples the process was conducted in a flow process, that is the water-propylene mixtures having the mole ratios indicated are pressurized to the contacting pressure, and the mixture is passed through a high pressure tube of 3/16-inch internal diameter and 9/16-inch outer diameter containing the non-water pretreated catalyst as a fixed bed of 20 to 40 mesh particle size. The silica-alumina catalyst consisting of 10 to 30% alumina and 90 to 70% silica used in the process of this invention need not be preconditioned, for example, by first treating with water at the contacting conditions, for the non-water treated catalyst produces high conversions of propylene and yields of propanol without such pretreatment as the data hereinafter clearly establish. The pressurized water-propylene mixture is fed down through the fixed catalyst bed. The reactor effluent is cooled to ambient temperature, unreacted propylene evaporated while depressurizing the cooled reactor effluent. The isopropanol content of the cool propylene free reactor effluent is determined. Each pressure variation is set forth in a separate table wherein the specific conditions are shown. The particular silica-alumina catalyst employed consists of particles of 25% alumina and 75% silica of uniform composition not pretreated with water at olefin hydration conditions. In these tables which follow, "WHSV" is used to indicate weight hourly space velocity of propylene feed per unit weight of catalyst.

TABLE I.—PROPYLENE HYDRATION—100,000 p.s.i.

| Conditions | Example 1 | Example 2 |
|---|---|---|
| Temp., °F | 450 | 450 |
| WHSV, $C_3H_6$ | 1.25 | 2.94 |
| WHSV, total feed | 4.06 | 10.6 |
| Mol. ratio $H_2O/C_3H_6$ | 4.24 | 6.05 |
| Alcohol in product, vol. percent | 51 | 40.8 |
| Conversion of $C_3H_6$ (moles) to— | | |
| Isopropyl alcohol | 83.9 | 84.7 |
| Diisopropyl ether | 8.3 | 6.5 |
| Wt. percent yield based on $C_3H_6$ charged: | | |
| Isopropyl alcohol | 119.8 | 121 |
| Diisopropyl ether | 10.2 | 8.0 |

TABLE II.—PROPYLENE HYDRATION—75,000 p.s.i.

| Conditions | Example 3 | Example 4 | Example 5 | Example 6 | Example 7 |
|---|---|---|---|---|---|
| Temp., °F | 475 | 475 | 450 | 450 | 425 |
| WHSV, $C_3H_6$ | 1.3 | 2.65 | 1.12 | 3.08 | 1.32 |
| WHSV, total feed | 3.45 | 8.26 | 2.54 | 10.44 | 4.38 |
| Mol. ratio $H_2O/C_3H_6$ | 5.05 | 4.93 | 2.93 | 5.54 | 5.42 |
| Alcohol in product, vol. percent | 45.6 | 44.0 | 59.0 | 37.4 | 35.9 |
| Conversion of $C_3H_6$ (moles) to— | | | | | |
| Isopropyl alcohol | 85.0 | 79.1 | 75.9 | 70.4 | 63.1 |
| Diisopropyl ether | 8.2 | 6.2 | 10.5 | | |
| Wt. percent yield based on $C_3H_6$ charged: | | | | | |
| Isopropanol | 121.5 | 120.0 | 108.5 | 101.0 | 90.2 |
| Diisopropyl ether | 10.3 | 7.5 | 13.1 | | |

TABLE III.—PROPYLENE HYDRATION—50,000 p.s.i.

| Conditions | Example 8 | Example 9 | Example 10 | Example 11 | Example 12 |
|---|---|---|---|---|---|
| Temp., °F | 505 | 475 | 475 | 475 | 450 |
| WHSV, $C_3H_6$ | 1.46 | 1.1 | 2.8 | 2.91 | .47 |
| WHSV, total feed | 6.04 | 2.07 | 8.14 | 8.07 | 4.32 |
| Mol. ratio $H_2O/C_3H_6$ | 7.40 | 6.52 | 4.38 | 4.14 | 19.2 |
| Alcohol in product, vol. percent | 28 | 39 | 44 | 44.8 | 18 |
| Conversion of $C_3H_6$ (moles) to— | | | | | |
| Isopropanol | 70.7 | 80.9 | 69.9 | 68.9 | 90.6 |
| Diisopropyl ether [1] | 16.1 | 7.4 | +5.3 | ([2]) | |
| Wt. percent yield based on $C_3H_6$ charged: | | | | | |
| Isopropanol | 111.0 | 115.5 | 100.2 | 98.5 | 129.3 |
| Diisopropyl ether [1] | 19.5 | 9.0 | 6.4 | | |

[1] Includes any propylene polymer.
[2] Trace.

TABLE IV.—PROPYLENE HYDRATION—25,000 p.s.i.

| Conditions | Example 13 | Example 14 | Example 15 | Example 16 |
|---|---|---|---|---|
| Temp., °F | 500 | 500 | 500 | 475 |
| WHSV, $C_3H_6$ | 1.18 | 1.42 | 2.87 | 1.26 |
| WHSV, total feed | 4.82 | 4.5 | 9.97 | 4.73 |
| Mol. ratio $H_2O/C_3H_6$ | 7.18 | 5.03 | 5.64 | 6.26 |
| Alcohol in product, vol. percent | 30.1 | 37.6 | 33.8 | 35.6 |
| Conversion in $C_3H_6$ (moles) to— | | | | |
| Isopropanol | 65.8 | 69.7 | 62.1 | 72.4 |
| Diisoproypl ether | 2.7 | 4.1 | ([1]) | ([1]) |
| Wt. percent yield based on $C_3H_6$ charged: | | | | |
| Isopropanol | 93.5 | 100.0 | 88.6 | 103.4 |
| Diisopropyl ether | 3.4 | 3.8 | 2.2 | 3.6 |

[1] Trace.

TABLE V.—PROPYLENE HYDRATION—15,000 p.s.i.

| Conditions | Example 17 | Example 18 | Example 19 | Example 20 | Example 21 | Example 22 | Example 23 | Example 24 |
|---|---|---|---|---|---|---|---|---|
| Temp., °F | 525 | 500 | 500 | 485 | 485 | 450 | 450 | 500 |
| WHSV, $C_3H_6$ | 1.16 | 1.3 | 1.21 | 2.81 | 3.08 | 6.23 | 2.78 | 5.3 |
| WHSV, total feed | 4.68 | 4.74 | 4.50 | 9.6 | 9.75 | 16.4 | 9.12 | 15.8 |
| Mol. ratio $H_2O/C_3H_6$ | 7.10 | 6.19 | 6.24 | 5.66 | 5.08 | 3.82 | 5.32 | 4.66 |
| Alcohol in product, vol. percent | 26.7 | 31.8 | 30.1 | 33.9 | 32.6 | 16.1 | 24.9 | 36.9 |
| Conversion in $C_3H_6$ (moles) to— | | | | | | | | |
| Isopropanol | 58.1 | 62.2 | 59.6 | 61.6 | 52.4 | 25.8 | 38.6 | 52.6 |
| Diisopropyl ether | | | | ([1]) | ([1]) | | | |
| Wt. percent yield based on $C_3H_6$ charged: | | | | | | | | |
| Isopropanol | 83.0 | 89.0 | 85.1 | 88.1 | [2] 75.0 | 37.2 | 55.2 | 75.2 |
| Diisopropyl ether | | | | ([1]) | ([1]) | | | |

[1] Trace.
[2] Catalyst was treated with water at 15,000 p.s.i. and 500° C. for 69.5 hrs. and then dried before using.

TABLE VI.—PROPYLENE HYDRATION—10,000 p.s.i.

| Conditions | Example 25 | Example 26 | Example 27 | Example 28 |
| --- | --- | --- | --- | --- |
| Temp., °F | 525 | 525 | 500 | 500 |
| WHSV, $C_3H_6$ | 1.57 | 3.52 | 1.74 | 5.60 |
| WHSV, total feed | 4.86 | 10.7 | 5.39 | 15.70 |
| Mol. ratio $H_2O/C_3H_6$ | 4.83 | 4.75 | 4.94 | 4.28 |
| Alcohol in product, vol. percent | 29.8 | | | |
| Conversion of $C_3H_6$ (moles) to— | | | | |
| Isopropanol | 46.4 | 40.1 | 50.5 | 42.2 |
| Diisopropyl ether | | | | |
| Wt. percent yield based on $C_3H_6$ charged: | | | | |
| Isopropanol | 66.5 | 57.5 | 72.2 | 60.2 |
| Diisopropyl ether | | | | |

TABLE VII.—PROPYLENE HYDRATION—5,000 p.s.i.

| Conditions | Example 29 | Example 30 | Example 31 | Example 32 |
| --- | --- | --- | --- | --- |
| Temp., °F | 525 | 525 | 500 | 500 |
| WHSV, $C_3H_6$ | 1.79 | 3.7 | 1.68 | 1.80 |
| WHSV, total feed | 5.48 | 11.0 | 4.90 | 5.50 |
| Mol. ratio $H_2O/C_3H_6$ | 4.93 | 4.56 | 4.49 | 4.79 |
| Alcohol in product, vol. percent | 25.9 | 26.2 | 26.3 | 26.7 |
| Conversion of $C_3H_6$ (moles) to— | | | | |
| Isopropanol | 38.6 | 34.8 | 35.1 | 38.8 |
| Diisopropyl ether | | | | |
| Wt. percent yield based on $C_3H_6$ charged: | | | | |
| Isopropanol | 55.5 | 49.8 | 50.1 | 55.4 |
| Diisopropyl ether | | | | |

TABLE VIII
Propylene hydration—2,000 p.s.i.

| Conditions: | Example 33 |
| --- | --- |
| Temp., °F | 500 |
| WHSV, $C_3H_6$ | .95 |
| WHSV, total feed | 4.6 |
| Mol. ratio $H_2O/C_3H_6$ | 8.78 |
| Alcohol in product, vol. percent | 10.0 |
| Conversion of $C_3H_6$ (moles)— | |
| To isopropanol | 30.0 |
| To diisopropyl ether | — |
| Wt. percent yield based on $C_3H_6$ charged— | |
| Isopropanol | 43.0 |
| Diisopropyl ether | — |

The foregoing data all obtained from temperatures, pressures and weight hourly space velocities for contacting the indicated water-propylene mixtures with the non-water pretreated catalyst whose particles consist essentially of uniform composition 25% alumina and 75% silica.

High conversions of ethylene to ethanol at substantially as high space velocities of ethylene are obtainable at temperatures up to 600 to 675° F. and using the non-water pretreated 10 to 30% alumina-90 to 70% silica catalyst. There was very little ether formation at 600° F. At other temperatures for example, water-ethylene mixture with 6.95 moles water per mole ethylene at 5000 p.s.i. and 670° F. contact conditions and at a weight hourly space velocity of 7.36 ethylene gives ethylene conversions of about 38% to ethanol, 2.4% to diethyl ether and 0.5% to polymer; water-ethylene mixture of 6.93 moles water per mole ethylene at ethylene weight hourly space velocity of 2.36, 10,000 p.s.i.g. and 650° F. gives ethylene conversions of 43.7% to ethanol, 6.0% to diethylether and 0.9% polymer; and water-ethylene mixture of 8.22 moles water per mole ethylene, at 3.03 weight hourly space velocity of ethylene, 15,000 p.s.i. and 625° F. gives ethylene conversion of 51% to ethanol, 5.4% to diethyl ether and 2.5% to polymer.

What is claimed is:

1. A process for the catalytic conversion of $C_2+C_5$ olefin hydrocarbons to the corresponding $C_2$ to $C_5$ alcohols which comprises contacting in a catalytic zone a wholly liquid phase water-olefin mixture having a mole ratio of 1 to 10 moles water per mole of said olefin, at a temperature in the range of 300 to 675° F., and a pressure in the range of 2000 to 100,000 p.s.i. with a catalyst whose particles consist essentially of alumina and silica in the range of 10 to 30% alumina and 90 to 70% silica by weight, the sum of which equals 100%, in substantially uniform composition throughout the particles at a weight hourly space velocity of 2 to 20 parts of said water-olefin mixture per part of catalyst by weight, said catalyst prior to said contacting is not preconditioned by treatment with water at said temperature and pressure ranges.

2. A process for the conversion of propylene into isopropanol which comprises contacting a wholly liquid phase water-propylene mixture having the mole ratio of 1 to 10 moles of water per mole of propylene in a contacting zone at a temperature in the range of 350 to 575° F. at a pressure in the range of 2,000 to 100,000 p.s.i.g. with silica-alumina catalyst whose particles consist essentially of alumina and silica in the range of 10 to 30% alumina and 90 to 70% silica by weight, the sum of which is 100%, in substantially uniform composition throughout the particles at a weight hourly space velocity in the range of 2 to 20 parts of said water-propylene mixture per part of catalyst by weight, said catalyst prior to said contacting is not preconditioned by treatment with water at said temperature and pressure ranges.

3. The process of claim 2 wherein the water-propylene mixture mole ratio is 2.5 to 6 moles water per mole propylene, the water-propylene mixture weight hourly space velocity is in the range of 4 to 8 parts per part of catalyst and the contacting is at a temperature in the range of 450 to 525° F. at a pressure of 5,000 p.s.i.

4. The process of claim 2 wherein the water-propylene mixture mole ratio is in the range of 3 to 6 moles water per mole propylene, the water-propylene mixture weight hourly space velocity is 4 to 12 parts per part of catalyst and the contacting is at a temperature in the range of 450 to 525° F. and a pressure of 10,000 p.s.i.

5. The process of claim 2 wherein the water-propylene mixture mole ratio is in the range of 3.5 to 7 moles water per mole propylene, the water-propylene mixture weight hourly space velocity is 4 to 20 parts per part of catalyst and the contacting is at a temperature in the range of 475 to 525° F. and at a pressure of 15,000 p.s.i.

6. The process of claim 2 wherein the water-propylene mixture mole ratio is in the range of 4 to 7 moles water per mole propylene, the water-propylene mixture weight hourly space velocity is 4.5 to 11 parts per part of catalyst and the contacting is at a range of 475 to 500° F. and at a pressure of 25,000 p.s.i.

7. The process of claim 2 wherein the water-propylene mixture mole ratio is in the range of 1.8 to 10 moles water per mole propylene, the water-propylene mixture weight hourly space velocity is 2 to 13 parts per part of catalyst, and the contacting is at a temperature in the range of 450 to 500° F. and at a pressure of 50,000 p.s.i.

8. The process of claim 2 wherein the water-propylene mixture mole ratio is in the range of 3 to 6 moles water per mole propylene, the water-propylene mixture weight hourly space velocity is 2 to 11 parts per part of catalyst, and the contacting is at a temperature in the range of 425 to 475° F. and at a pressure of 75,000 p.s.i.

9. The process of claim 2 wherein the water-propylene mixture mole ratio is in the range of 4 to 6 moles water per mole propylene, the water-propylene mixture weight hourly space velocity is 4 to 11 parts per part of catalyst and the contacting is at a temperature in the range of 400 to 450° F. and at a pressure of 100,000 p.s.i.

10. The process of claim 2 wherein the water-propylene mixture mole ratio is 8.78 moles water per mole propylene, the water-propylene mixture weight hourly space velocity is 4.6 parts per part of catalyst, the catalyst is 25% alumina and 75% silica by weight and the contacting is at a temperature of 500° F. and a pressure of 2000 p.s.i.

11. The process for converting ethylene to ethanol which comprises contacting a wholly liquid phase water-ethylene mixture having 1 to 10 moles water per mole ethylene in a contacting zone with a catalyst consisting essentially of 25% alumina and 75% silica at 625 to 670° F. and a pressure in the range of 5000 to 15,000 p.s.i. at a weight hourly space velocity of 2 to 7 parts water-ethylene mixture per part of catalyst by weight, said catalyst prior to said contacting is not preconditioned by treatment with water at said temperature and pressure ranges.

References Cited

UNITED STATES PATENTS

| | | | |
|---|---|---|---|
| 2,658,924 | 11/1953 | Lukasiewicz et al. | 260—641 |
| 2,683,753 | 7/1954 | Levy et al. | 260—641 |
| 3,006,970 | 10/1961 | Beuther et al. | 260—641 |
| 3,076,036 | 10/1963 | Hansen | 260—641 |

LEON ZITVER, *Primary Examiner.*

J. E. EVANS, *Assistant Examiner.*

U.S. Cl. X.R.

252—455; 260—94.9, 614